(12) United States Patent
Ooi et al.

(10) Patent No.: US 7,797,736 B2
(45) Date of Patent: *Sep. 14, 2010

(54) SYSTEM AND METHOD FOR AUTHENTICATION

(75) Inventors: Chin Shyan Ooi, Singapore (SG); Lay Chuan Lim, Singapore (SG); Teng Pin Poo, Singapore (SG); Henry Tan, Singapore (SG)

(73) Assignee: Trek 2000 International Ltd., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 12/197,843

(22) Filed: Aug. 25, 2008

(65) Prior Publication Data

US 2009/0049536 A1    Feb. 19, 2009

Related U.S. Application Data

(62) Division of application No. 10/502,005, filed on Jul. 19, 2004, now Pat. No. 7,434,251.

(30) Foreign Application Priority Data

Jul. 31, 2002  (WO) ............... PCT/SG02/00171
Oct. 4, 2002   (WO) ............... PCT/SG02/00227

(51) Int. Cl.
    G06F 7/04    (2006.01)
    H04L 9/32    (2006.01)
(52) U.S. Cl. .................. 726/9; 713/185; 709/219
(58) Field of Classification Search .............. None
    See application file for complete search history.

(56) References Cited

U.S. PATENT DOCUMENTS

| | | | |
|---|---|---|---|
| 5,469,564 A | 11/1995 | Junya | |
| 5,655,077 A | 8/1997 | Jones et al. | |
| 6,038,320 A * | 3/2000 | Miller | 380/44 |
| 6,061,799 A | 5/2000 | Eldridge et al. | |
| 6,087,955 A | 7/2000 | Gray | |
| 6,178,508 B1 * | 1/2001 | Kaufman | 713/183 |
| 6,618,807 B1 * | 9/2003 | Wang et al. | 713/189 |
| 6,725,382 B1 * | 4/2004 | Thompson et al. | 726/19 |
| 6,763,399 B2 * | 7/2004 | Margalit et al. | 710/13 |
| 6,848,045 B2 * | 1/2005 | Long et al. | 726/20 |
| 6,880,054 B2 * | 4/2005 | Cheng et al. | 711/164 |
| 7,036,738 B1 * | 5/2006 | Vanzini et al. | 235/486 |
| 7,039,759 B2 * | 5/2006 | Cheng et al. | 711/115 |

(Continued)

FOREIGN PATENT DOCUMENTS

EP    1085521 A1    3/2001

(Continued)

*Primary Examiner*—Christian LaForgia
(74) *Attorney, Agent, or Firm*—White & Case LLP

(57) ABSTRACT

A system and method for authentication including verifying a password is disclosed. In one embodiment, the authentication system includes a first storage unit to store an authentication sequence and a read-only memory unit to store an authentication algorithm. A microcontroller is coupled to the first storage unit, the read-only memory unit, and is configured to be coupled to and uncoupled from a host. The microcontroller is configured to execute the authentication algorithm to verify a password with the authentication sequence, and to send an access request to a web server via the host if the authentication algorithm has verified the password with the authentication sequence.

7 Claims, 7 Drawing Sheets

U.S. PATENT DOCUMENTS

| | | | |
|---|---|---|---|
| 7,111,324 B2 * | 9/2006 | Elteto et al. | 726/9 |
| 7,269,258 B2 * | 9/2007 | Ishihara et al. | 380/263 |
| 7,434,251 B2 * | 10/2008 | Ooi et al. | 726/9 |
| 2002/0174287 A1 * | 11/2002 | Cheng | 711/103 |
| 2003/0095659 A1 * | 5/2003 | Ishihara et al. | 380/46 |
| 2004/0025031 A1 * | 2/2004 | Ooi et al. | 713/186 |

FOREIGN PATENT DOCUMENTS

| | | |
|---|---|---|
| EP | 0674290 B1 | 7/2004 |
| GB | 2197734 A | 5/1998 |
| GB | 2361558 A | 10/2001 |
| JP | 2002-222022 A | 8/2002 |
| WO | WO95/16238 A1 | 6/1995 |

* cited by examiner

SYSTEM AND METHOD FOR AUTHENTICATION

CROSS-REFERENCE TO RELATED APPLICATION

This application is a divisional of U.S. patent application Ser. No. 10/502,005, entitled "System and Method for Authentication," filed on Jul. 19, 2004, now U.S. Pat. No. 7,434,251, which claims priority to PCT Application No. PCT/SG02/00227, filed on Oct. 4, 2002. The subject matter of the related applications is hereby incorporated by reference in its entirety.

FIELD OF THE INVENTION

The present invention relates generally to digital and software piracy. More particularly, the present invention relates to a system and a method for authentication to prevent piracy in a digital system.

BACKGROUND

The piracy and illegal copying of software and other digital media has become extremely pervasive and currently results in billions of dollars in lost revenue for media and software owners worldwide. This problem is compounded by the advent of faster and more technologically advanced computers, the development of inexpensive mass storage media (e.g., CDs, DVDs), as well as copying devices such as CD writers, which aid in various aspects of digital piracy.

Each technological breakthrough seemingly results in a new and better way to illegally copy intellectual property belonging to another. Examples of digital piracy include: the copying of proprietary software to sell to others, the installing of a single proprietary software package on several different systems, placing a copy of proprietary software on the Internet, or even downloading copyrighted images from the Internet.

While digital piracy is fairly common among many end users who have lawfully purchased the software, large-scale piracy typically occurs at a reseller level. For instance, a reseller may duplicate and distribute multiple copies of a software program, a digital audio file, or a digital video file to different customers. These counterfeit versions are sometimes passed on to unsuspecting customers. Hardware distributors have been known to preload different systems using a single software package. In such instances, customers are either not provided with original manuals, diskettes and/or compact discs (CDs) or are simply supplied with pirated copies of the same.

Numerous methods to combat the rampant problem of digital piracy have been devised. One of the methods is the use of trialware to restrict usage of a software product. Trialware may be implemented by either programming an expiration date or a usage counter into a software program. Such a scheme limits the use of a software product to a particular duration or a number of trial times, respectively, after which the protected application can no longer be launched. Users are then forced to either purchase the full version of the product or to quit using it altogether.

Hardware keys are another type of anti-piracy device that is commonly used to prevent illegal use of software. Hardware keys are devices that are plugged into selected ports of a computer. Once the software is executed, it then detects the presence of a hardware key in a similar manner to detecting other hardware devices (such as a printer, monitor, or a mouse). Programming the software such that it only operates when an appropriate hardware key is attached prevents illegal use of the software. As the number of hardware keys distributed to end users corresponds to the number of seat licenses purchased, the software will not work when installed on another system without the requisite hardware key.

Another common anti-piracy technique is to require the entry of a certain registration key that is supplied by the software company before the software can be installed. Traditionally, the registration keys are given only with the original software package, although some are issued electronically. Unfortunately, there is nothing to prevent the holder of the registration key from installing the software on multiple systems. In addition, many of the electronic registration keys are based on the user's personal information (such as the user's name), therefore, some hackers have developed programs to calculate registration keys for random names.

Unfortunately, as with the use of the registration key, all of the above anti-piracy systems (and many others) are easily circumvented by hackers. A common method of combating these anti-piracy techniques is to disassemble the coding of the Application Programming Interface (API) to assembly language and, thereafter decompile the assembly language into programming language. With the knowledge gained from the program flow, the hacker can easily re-write the program or set certain conditions within the program itself, such that it bypasses all the anti-piracy authentication algorithms.

In view of the foregoing, it is extremely desirable to have an anti-piracy system that cannot be easily re-programmed or bypassed by computer hackers and other digital pirates. It is also desirable to have an anti-piracy system that can be integrated with existing mass storage devices.

SUMMARY OF THE INVENTION

The present invention fills these needs by providing a system and a method for authentication. It should be appreciated that the present invention can be implemented in numerous ways, including as a process, an apparatus, a system, a device, or a method. Several inventive embodiments of the present invention are described below.

In one embodiment of the present invention, an authentication system to verify a password is provided. The authentication system includes a first storage unit to store an authentication sequence and a read-only memory unit on which an authentication algorithm is programmed. The authentication sequence is preferably encrypted or hash-coded. A microcontroller is coupled to the first storage unit, the read-only memory unit, and a web server. A second storage unit coupled to the microcontroller is to store data from the web server. The microcontroller receives the password and executes the authentication algorithm to verify the password with the authentication sequence. Access to data on the second storage unit is permitted by the microcontroller only if the password has been verified. The data from the web server to be stored on the second storage unit is preferably encrypted. Alternatively, the data may be hash-coded.

The read-only memory unit preferably includes a shutdown algorithm to shut down the host and the authentication system when a series of incorrect passwords is received by the microcontroller. The first storage unit, the microcontroller, the read-only memory unit, and the second storage unit are preferably implemented on a single chip. In addition, it is also a preference to have the first storage unit and the read-only memory unit incorporated into the microcontroller.

In a preferred embodiment of the present invention, the authentication algorithm is implemented on either firmware or hardware. The first storage unit is preferably located within the read-only memory unit and the authentication sequence is preferably hard coded into the authentication algorithm. Alternatively, the first storage unit may be located within the second storage device.

In another embodiment of the present invention, a method for authenticating a password is provided. The method begins by providing an authentication sequence and receiving the password. An authentication algorithm, stored on a read-only memory unit, is executed to verify the password with the authentication sequence. Access to data on a web server or to a storage unit is permitted only if the password is verified. It is also preferable to shut down the entire system if a certain number of incorrect passwords are received. Data from the web server and that is to be stored in the storage unit is preferably encrypted or decrypted. Alternatively, the data may be hash-coded.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION

A system and a method for authentication in a digital system are provided. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1:
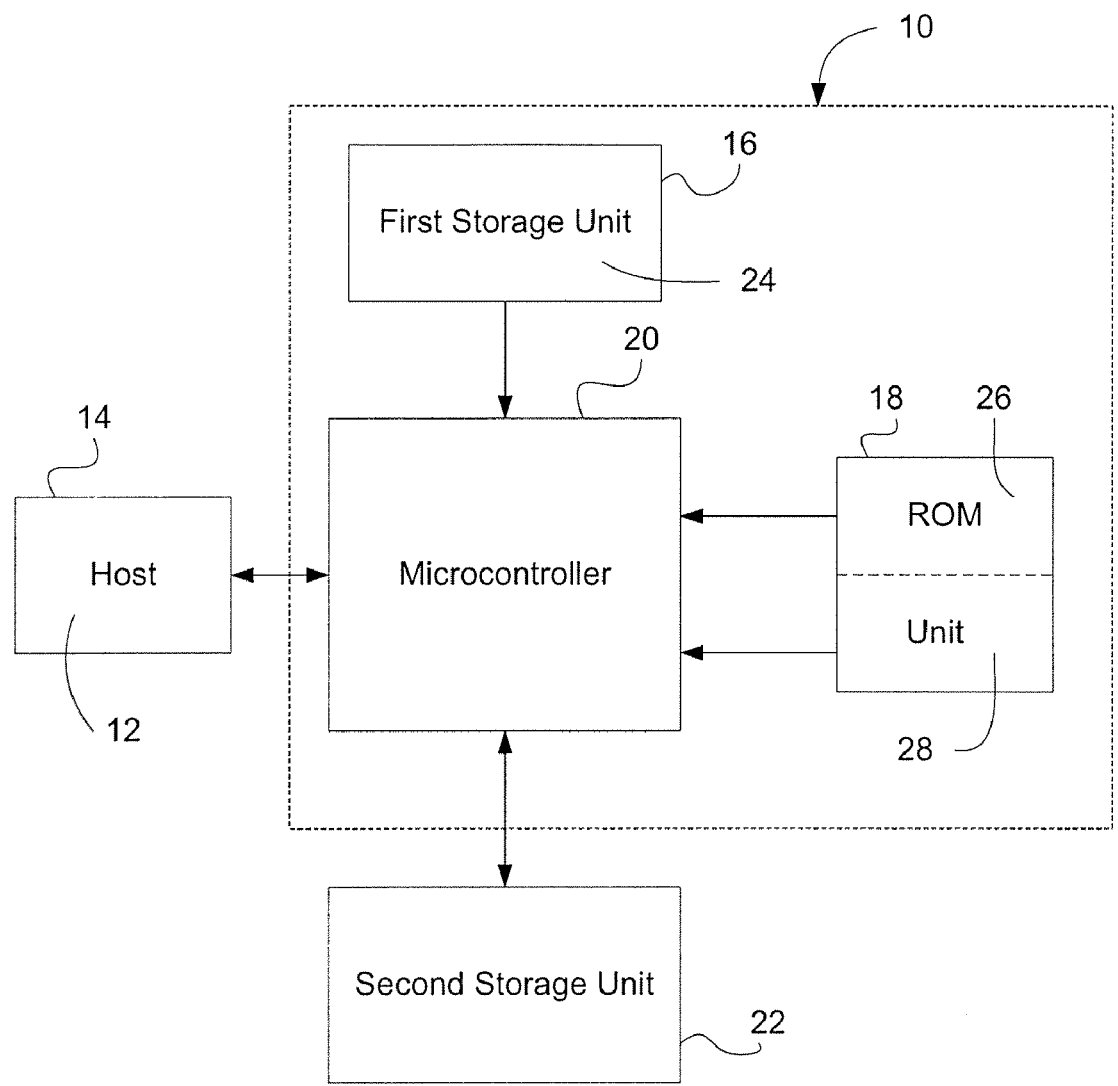
FIG. 1 illustrates a schematic of an authentication system to verify a password from a host in accordance with one embodiment of the present invention.

FIG. 1 illustrates an authentication system 10 to verify a password 12 from a host 14 in accordance with one embodiment of the present invention. Authentication system 10 includes a first storage unit 16, a read-only memory (ROM) unit 18 and a microcontroller 20. Microcontroller 20 is coupled to host 14, first storage unit 16, ROM unit 18 and a second storage unit 22. Microcontroller 20 is preferably coupled to host 14 through a Universal Serial Buss (USB) controller.

In other embodiments of the present invention, ROM unit 18 may be formed as part of microcontroller 20. Furthermore, both first storage unit 16 and second storage unit 22 may be one of a number of mass storage devices, including hard drives, floppy disks, or removable flash memory devices, such as the ThumbDrive® manufactured by Trek 2000. In addition, the two storage units may be utilized in one physical structure to form a single mass storage device. The mass storage device may also be placed with microcontroller 20 to form a single chip.

First storage unit 16 stores an authentication sequence 24, which is used to verify password 12. An authentication algorithm 26 to authenticate password 12 with authentication sequence 24 is programmed onto ROM unit 18. In addition, ROM unit 18 preferably comprises a shutdown algorithm 28. Because these algorithms and other data are hard coded, the contents of ROM unit 18 cannot be decompiled or altered. Upon receiving password 12, microcontroller 20 loads and executes authentication algorithm 26 to verify password 12 with authentication sequence 24. Access to second storage unit 22 is permitted only if password 12 is verified.

Password 12 may be entered by a user or a software program executed by host 14 after receiving a query from microcontroller 20. Because authentication algorithm 26 is hard coded onto ROM unit 18, copying or decompiling and changing the software program resident on host 14 does not breach the copy protection provided by the present invention. It will be apparent to one skilled in the art that password 12 may be a private string of characters, a sequence of communication protocols, or some other security protocol known only to an authorized user. In addition, password 12 and authentication sequence 24 may form part of a biometric authentication process by using a user's fingerprints, iris, face, or voice as authentication means.

Password 12 may also be programmed into the software running on host 14 and recognizable only by authentication algorithm 26 and therefore not known to an end user. As described above, authentication algorithm 26 is preferably implemented on hardware or firmware (such as ROM unit 18) so that it is tamper resistant; that is, authentication algorithm 26 will be either extremely difficult to reverse engineer or extract data from, and therefore extremely difficult to bypass.

Shutdown algorithm 28 is preferably implemented as a deterrent against brute force attacks by shutting down the entire system if a series of incorrect passwords is received by microcontroller 20. An authentication system programmer may define the maximum number of incorrect passwords allowed before the system shuts down. Shutdown algorithm 28 may also be programmed to not accept any more password entries for a specified amount of time. By using shutdown algorithm 28, trial and error methods used by brute force application programs to identify password 12 would become an extremely tedious process for hackers. The algorithm would therefore deter potential hackers from even attempting to identify password 12.

Second storage unit 22 is used to store programs and/or files, which are required for a program on host 12 to run. Examples of such files include executable programs (such as a software installer), digital audio files, digital video files, image files, text files, and library files. Microcontroller 20 allows access to second storage unit 22 from host 14 only if the correct password 12 has been received by microcontroller 20.

Although illustrated in this embodiment as separate entities, it should be evident to a person skilled in the art that microcontroller 20, first storage unit 16, ROM unit 18 and second storage unit 22 may be combined in a number of ways. For example, microcontroller 20, first storage unit 16, ROM unit 18 and second storage unit 22 may be implemented on a single semiconductor chip. In an alternative embodiment, microcontroller 20 and ROM unit 18 may be implemented on a chip that is separate from the storage units.

The present invention therefore has great flexibility of design that may easily be altered depending on a user's requirements. For example, on one hand, the use of multiple chips may allow different vendors to manufacture different parts of the authentication system. On the other hand, fabricating the present invention onto fewer chips (or a single chip) may be less expensive and provide better performance. In addition, if ROM unit 18 and microcontroller 20 are located on the same chip, it may be more difficult to separate the ROM to read the data stored.

Figure 2:
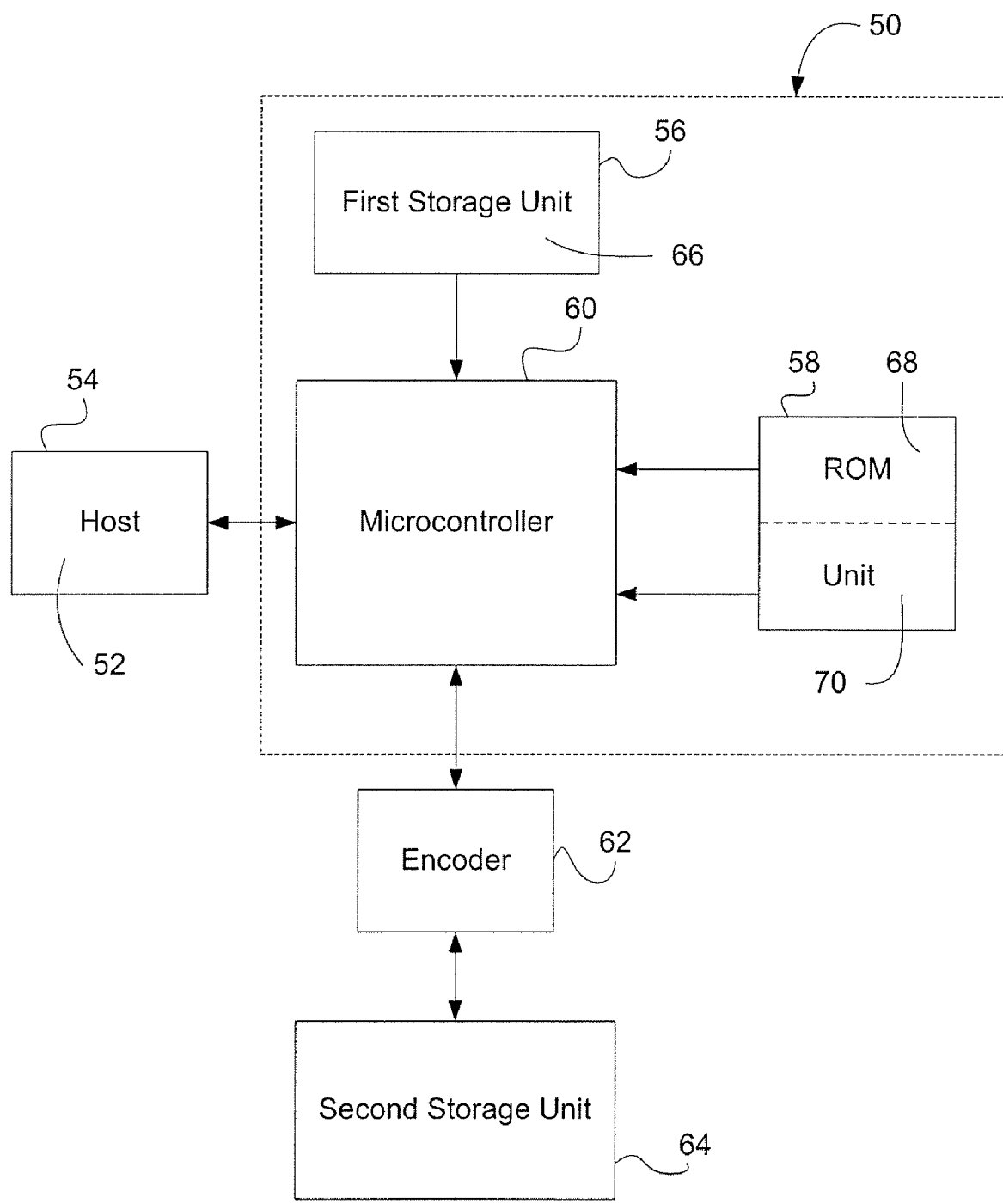
FIG. 2 illustrates a schematic of an authentication system to verify a password from a host in accordance with a further embodiment of the present invention.

FIG. 2 illustrates an authentication system 50 to verify a password 52 from a host 54 in accordance with a further embodiment of the present invention. Authentication system 50 comprises a first storage unit 56, a ROM unit 58 and a microcontroller 60. Microcontroller 60 is coupled to host 54, first storage unit 56, ROM unit 58, and an encoder 62. Encoder 62 is further coupled to a second storage unit 64. First storage unit 56 stores an authentication sequence 66, which is used to verify password 52. An authentication algorithm 68 to authenticate password 52 is programmed onto ROM unit 58. ROM unit 58 preferably includes a shutdown algorithm 70.

Upon receiving password 52, microcontroller 60 loads and executes authentication algorithm 68 to verify password 52 with authentication sequence 66. Access to second storage unit 64 is permitted only if password 52 is verified. Shutdown algorithm 70 preferably shuts down the entire system if a series of wrong passwords is received by microcontroller 60. An authentication system programmer determines the maximum number of incorrect password attempts allowed.

Data to be read from or written onto second storage unit 64 is first decrypted or encrypted respectively by encoder 62. Many different encryption schemes may be used by encoder 62, including International Data Encryption Algorithm (IDEA), Data Encryption Standard (DES) encryption, Triple Data Encryption Standard (3-DES) encryption, and Pretty Good Privacy (PGP). By encrypting the contents of second storage unit 64, a hacker will not be able to make sense of the contents even if he manages to read the contents by bypassing microcontroller 60 (for example, by using a probe). After password 52 has been authenticated, a decoder (not illustrated) may be used to decrypt the contents of second storage unit 64.

Alternatively, the data stored in second storage unit 64 may be protected by hash-coding. In addition, authentication sequence 66 is preferably encrypted or hashed as well to prevent hackers from unraveling authentication sequence 66. This may be accomplished without requiring an additional encoder if first storage unit 56 is located within second storage unit 64.

Figure 3:
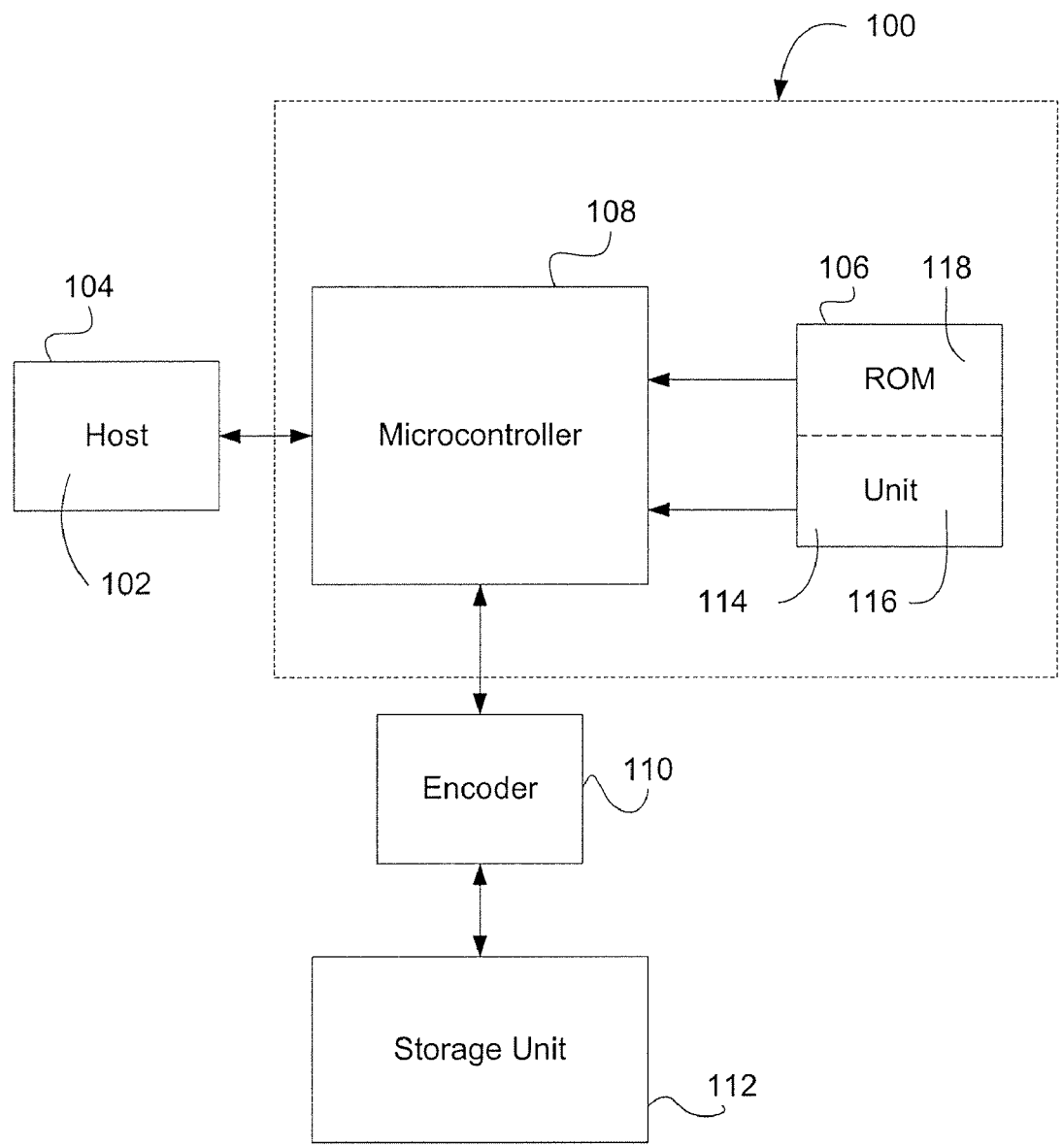
FIG. 3 illustrates a schematic of an authentication system to verify a password from a host in accordance with another embodiment of the present invention.

FIG. 3 illustrates a schematic of an authentication system 100 to verify a password 102 from a host 104 in accordance with another embodiment of the present invention. Authentication system 100 comprises a ROM unit 106 and a microcontroller 108. Microcontroller 108 is coupled to host 104, ROM unit 106, and an encoder 110. Encoder 110 is further coupled to a storage unit 112. An authentication algorithm 114 to authenticate password 102 is programmed onto ROM unit 106. An authentication sequence 116 to verify password 102 is hard coded into authentication algorithm 114. ROM unit 106 preferably comprises a shutdown algorithm 118.

As described in previous embodiments, upon receiving password 102, microcontroller 108 loads and executes authentication algorithm 114 to verify password 102 with authentication sequence 116. Access to storage unit 112 is permitted only if password 102 is verified. Shutdown algorithm 118 is preferably used to shut down the entire system if a series of incorrect passwords is received by microcontroller 108.

By hard coding authentication sequence 116 directly into authentication algorithm 114, possibly in multiple places, modification of authentication sequence 116 becomes substantially more difficult. In order to change a hard coded authentication sequence, not only is recompilation necessary (if using a compiled language), but also sufficient understanding of the implementation is required to ensure that the change will not cause program failure. Such a measure makes it difficult for a hacker to re-program authentication system 100.

Figure 4:
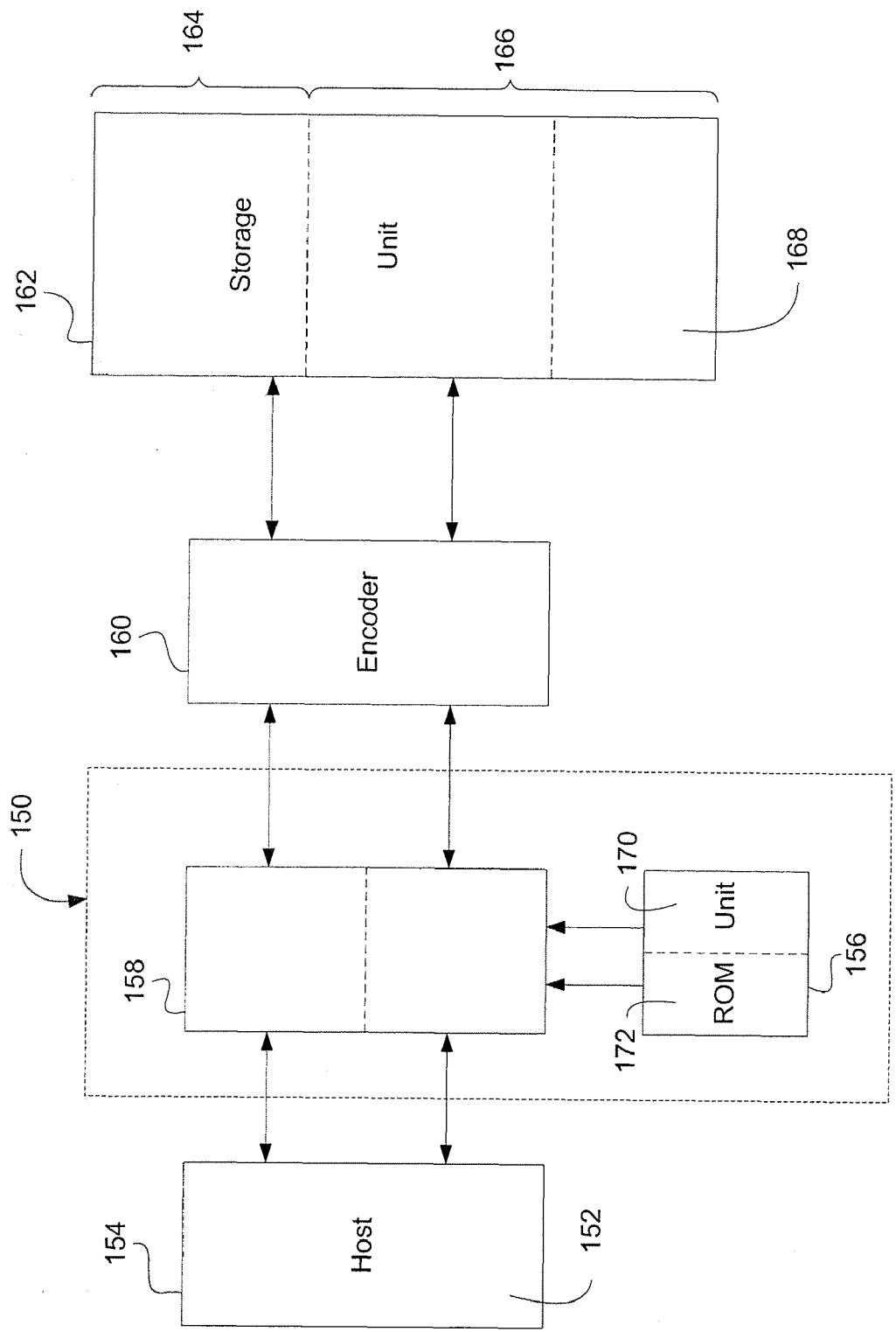
FIG. 4 illustrates a schematic of an authentication system to verify a password from a host in accordance with yet another embodiment of the present invention.

FIG. 4 illustrates an authentication system 150 to verify a password 152 from a host 154 in accordance with another embodiment of the present invention. Authentication system 150 comprises a read-only memory (ROM) unit 156 and a microcontroller 158. Microcontroller 158 is coupled to host 154, ROM unit 156 and an encoder 160. Encoder 160 is further coupled to a storage unit 162. Data to be read from or written onto storage unit 162 is first decrypted or encrypted respectively by encoder 160. Alternatively, hash-coding may be employed to protect the data stored in storage unit 162.

Storage unit 162 is made up of two types of data storage areas: a public storage area 164 and a private storage area 166. An authentication sequence 168, which is used to verify password 152, is stored in private storage area 166. An authentication algorithm 170 to authenticate password 152 is programmed onto ROM unit 156. ROM unit 156 also contains a shutdown algorithm 172. Public storage area 164 and private storage area 166 may be created by under-declaring the memory size available on storage unit 162.

Take for example a storage unit with physical addresses ranging from 000 to 1000. If only physical addresses 000 to 500 are declared to an operating system (OS) such as Windows®, on host 154, the OS will not be aware of the presence of physical addresses 501 to 1000. Under such circumstances, data stored within physical addresses 000 to 500 will be accessible to any user. This area is known as a public storage area. Conversely, the undeclared physical addresses 501 to 1000 form a private storage area since these addresses are only be available to microcontroller 158 and can only be accessed by an authorized user or software program.

Under non-secure operating conditions, any user may instruct host 154 to read data from or write data onto public storage area 164. However, if a user wishes to access private storage area 166, the user or the software program must first enter password 152, which is then sent to microcontroller 158 for authentication. Upon receiving password 152, microcontroller 158 executes authentication algorithm 170 to verify password 152 with authentication sequence 168. Access to private storage area 166 is permitted only if password 152 is verified. Shutdown algorithm 172 shuts down the entire system if a series of incorrect passwords is received by microcontroller 158.

Figure 5:
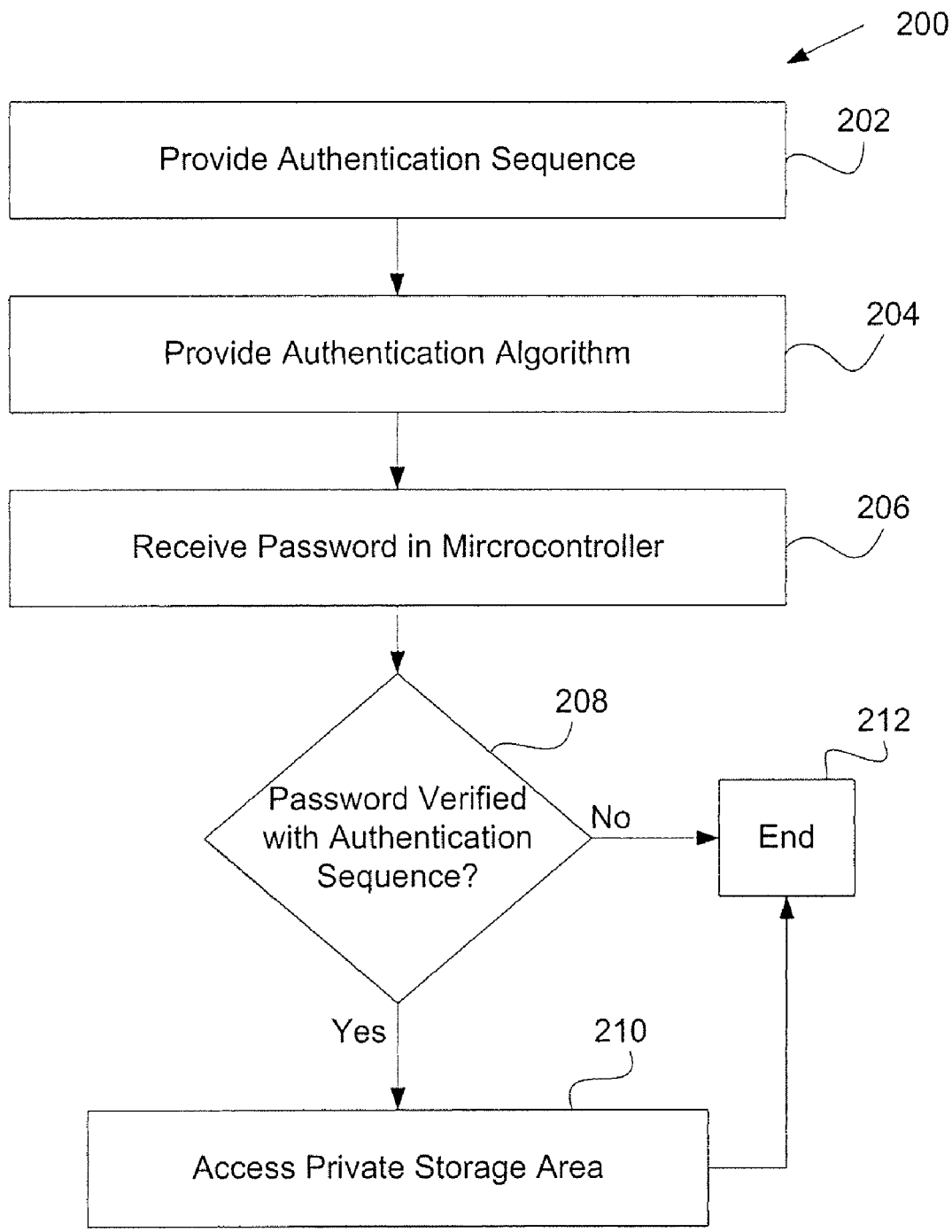
FIG. 5 illustrates a method for authenticating a password from a host in accordance with one embodiment of the present invention.

FIG. 5 illustrates a method 200 for authenticating a password from a host in accordance with one embodiment of the present invention. An authentication sequence is first provided in a block 202 and preferably stored in a first storage unit. Also provided, in another block 204, is an authentication algorithm, which is stored in a ROM unit. After receiving a prompt from the host, a password is entered in by a user or by a software program. The password is then received in a block 206 by a microcontroller that executes an authentication algorithm to verify the password with the authentication sequence in a decision block 208.

If the password is verified in decision block 208, access to a private area, such as the second storage unit in the above-described embodiments, will be permitted in a block 210. The user is then able to read from or write onto the second storage unit, which is preferably encrypted. If the password is not verified in decision block 208, the user will be denied access to the second storage unit and method 200 will end in a block 212. Alternatively, if the password is incorrect, the user may be given additional chances to enter the right password. However, the system is preferably shut down if a series of incorrect passwords is received by the microcontroller.

Figure 6:
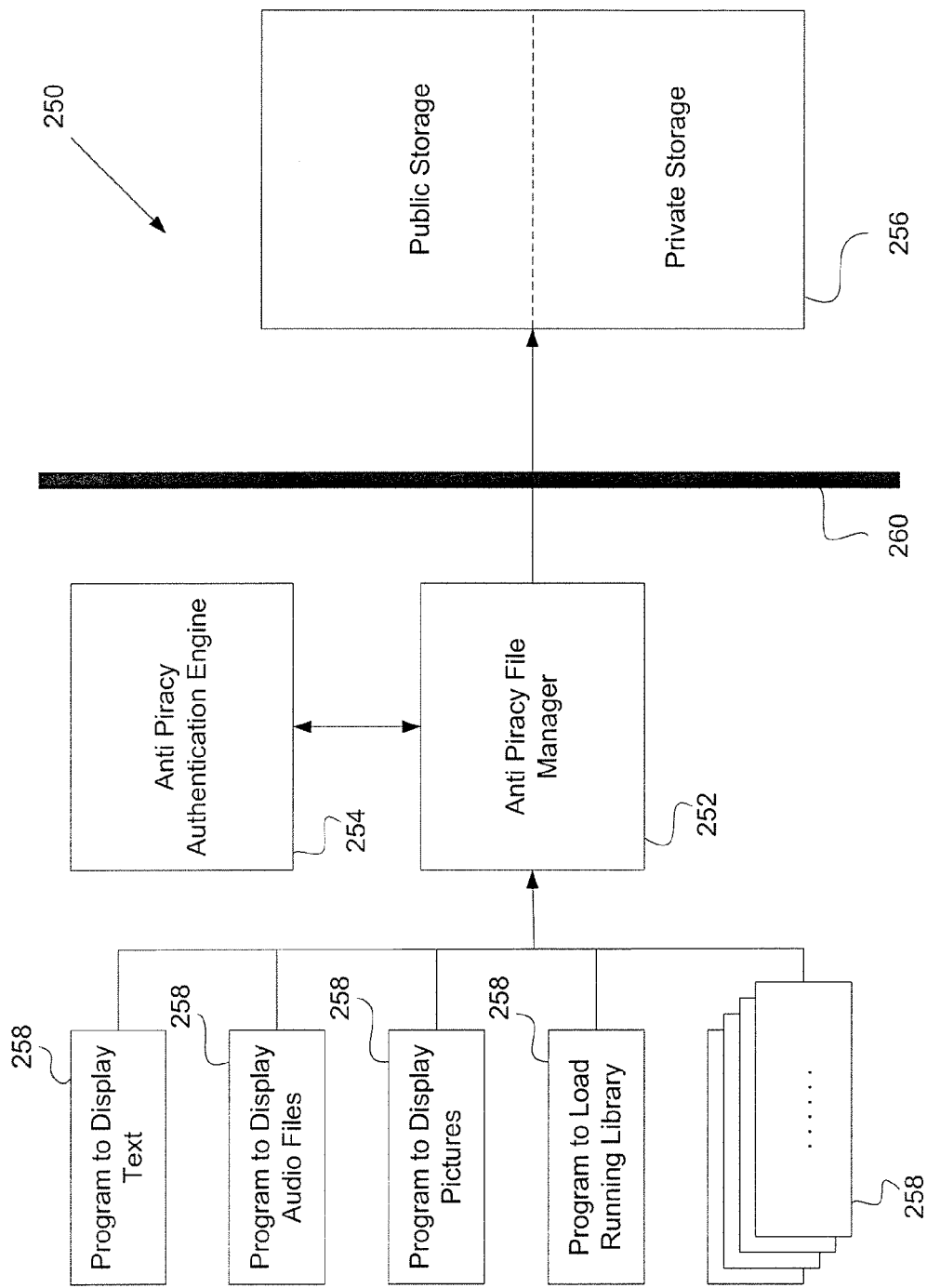
FIG. 6 illustrates a schematic of a computer system using an anti-piracy file manager in accordance with a further embodiment of the present invention.

FIG. 6 illustrates a schematic of a computer system 250 using an anti-piracy file manager 252 in accordance with a further embodiment of the present invention. Anti-piracy file manager 252 is coupled to an anti-piracy authentication engine 254 and a storage unit 256. Anti-piracy manager 252 answers requests from a number of software programs 258 that request different authentication schemes from anti-piracy authentication engine 254. Access to storage unit 256 is guarded by an authentication system 260. In this exemplary system, the flexibility of the present invention allows for authentication of many different types of software programs at the same time through anti-piracy file manager 252.

Figure 7:
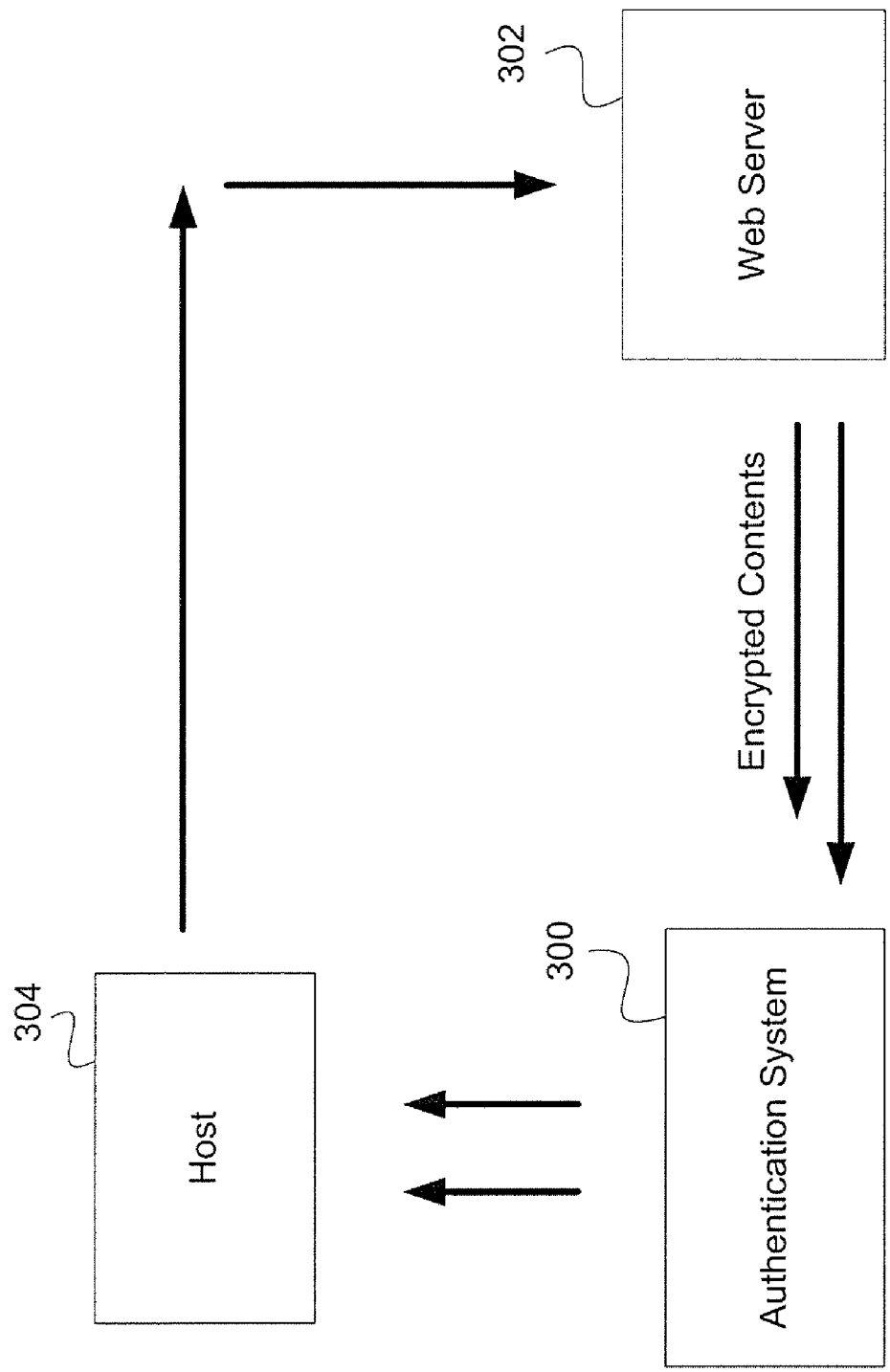
FIG. 7 illustrates a schematic of an authentication system for receiving data from a web server in accordance with another embodiment of the present invention.

FIG. 7 illustrates a schematic of an authentication system 300 for receiving data from a web server 302 in accordance with another embodiment of the present invention. Authentication system 300 is coupled to a host 304, which is connected to web server 302, typically by using either a dial-up or broadband connection. Host 304 is coupled to authentication system 300, preferably via a USB connector. Examples of host 304 include a personal computer (PC), a personal digital assistant (PDA), a Wireless Application Protocol-enabled (WAP-enable) mobile phone, and a tablet.

To retrieve data from web server 302, a password received by host 304 is verified by authentication system 300. The password is typically entered by a user or by software in the host. If the password is entered by the user, authentication system 300 may also be configured to accept a biometrics password, such as a fingerprint or a retina scan. If the verification is successful, authentication system 300 sends a request through host 304 for access to web server 302. Upon receiving the request, web server 302 grants access to a web page having secured data. The data may be in the form of a music file or an online book or a software program. Because the authentication algorithm in authentication system 300 is hard coded, an unauthorized user will not be able to circumvent or change the verification scheme in authentication system 300 and, hence will be unable to access the data on web server 302.

In another embodiment of the present invention, the password is embedded in the data to be retrieved from web server 302 via the Internet. Host 304 sends a request for the data to web server 302. Upon receiving the request, web server 302 sends the password embedded in the requested data to authentication system 300 for verification. If the verification is successful, authentication system 300 allows host 304 to access the data, upon which the data may be displayed or executed. In a preferred embodiment, the data from web server 302 is encrypted. Decryption of the data is carried out in authentication system 300 before use in host 304 or storage in authentication system 300.

Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

What is claimed is:

1. A system comprising:
    a first storage unit configured to store an authentication sequence;
    a read-only memory unit configured to store an authentication algorithm; and
    a microcontroller coupled to the first storage unit and the read-only memory unit, and configured to be coupled to and uncoupled from a host and configured to execute the authentication algorithm to verify a password with the authentication sequence;
    the microcontroller further configured to send an access request to a web server via the host if the authentication algorithm has verified the password with the authentication sequence.

2. The system of claim 1, further comprising a universal serial bus (USB) connector for coupling the microcontroller to the host.

3. The system of claim 1, further comprising a second storage unit coupled to the microcontroller.

4. The system of claim 3, wherein the microcontroller enables the host to access data stored in the second storage unit upon verification of the password with the authentication sequence.

5. The system of claim 3, wherein the microcontroller is further configured to receive data from the web server via the host and to store the data from the web server in the second storage unit.

6. The system of claim 3, further comprising an encoder coupled to the microcontroller, the encoder configured to encrypt data received from the web server.

7. The system of claim 3, further comprising an encoder coupled to the microcontroller, the encoder configured to decrypt data received from the web server.

* * * * *